(12) United States Patent
Ogura

(10) Patent No.: US 8,452,472 B2
(45) Date of Patent: May 28, 2013

(54) DRIVING CONTROL APPARATUS AND METHOD OF HYBRID VEHICLE

(75) Inventor: Hiroyuki Ogura, Toyoake (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 58 days.

(21) Appl. No.: 13/056,923

(22) PCT Filed: May 27, 2009

(86) PCT No.: PCT/JP2009/059677
§ 371 (c)(1),
(2), (4) Date: Jan. 31, 2011

(87) PCT Pub. No.: WO2010/137129
PCT Pub. Date: Dec. 2, 2010

(65) Prior Publication Data
US 2012/0059540 A1    Mar. 8, 2012

(51) Int. Cl.
*B60W 10/10*    (2012.01)
*B60W 20/00*    (2006.01)
*B60K 6/445*    (2007.10)

(52) U.S. Cl.
USPC .................. 701/22; 180/65.8; 180/65.235

(58) Field of Classification Search
None
See application file for complete search history.

(56) References Cited

U.S. PATENT DOCUMENTS

| | | | |
|---|---|---|---|
| 5,823,281 A | 10/1998 | Yamaguchi et al. | |
| 6,722,456 B2 * | 4/2004 | Hisada | 180/65.235 |
| 2002/0016660 A1 | 2/2002 | Suzuki et al. | |
| 2004/0055799 A1 * | 3/2004 | Atarashi et al. | 180/65.2 |

FOREIGN PATENT DOCUMENTS

| | | |
|---|---|---|
| JP | A-08-322108 | 12/1996 |
| JP | A-10-044789 | 2/1998 |
| JP | A-2001-152888 | 6/2001 |
| JP | A-2001-234768 | 8/2001 |
| JP | A-2002-051407 | 2/2002 |
| JP | A-2004-345527 | 12/2004 |
| JP | A-2005-192284 | 7/2005 |

OTHER PUBLICATIONS

International Search Report issued in PCT/JP2009/059677, dated Aug. 25, 2009.
Written Opinion of International Patent Application No. PCT/JP2009/059677, mailed on Aug. 25, 2009 (w/ partial English translation).
Jun. 5, 2012 Notice of Reasons for Refusal issued in Japanese Patent Application No. 2010-546753 (with translation).

* cited by examiner

*Primary Examiner* — Michael J Zanelli
(74) *Attorney, Agent, or Firm* — Oliff & Berridge, PLC

(57) ABSTRACT

A driving control apparatus of a hybrid vehicle is provided with: an internal combustion engine, a power dividing mechanism generator; an electric motor capable of outputting power according to electric power supplied from at least one of the generator and a storage battery, to a drive shaft; a changing device capable of changing an operating state of the generator, from one state to the other state out of a first state in which the rotating shaft of the generator can rotate and a second state in which a rotating shaft of the generator is fixed in a stop state; and a controlling device for controlling the changing device to change the operating state of the generator from the one state to the other state in a predetermined period in which the rotating shaft of the generator does not rotate.

12 Claims, 11 Drawing Sheets

(a) At the time of releasing MG1 lock (b) At the time of performing MG1 lock (a)

(b)

DRIVING CONTROL APPARATUS AND METHOD OF HYBRID VEHICLE

TECHNICAL FIELD

The present invention relates to a driving control apparatus and method of a hybrid vehicle.

BACKGROUND ART

As this type of apparatus, there is known a hybrid vehicle, provided with: an electric motor in addition to an internal combustion engine as a power source; a generator for generating electric power by the power of the internal combustion engine; and a battery capable of storing electric power generated by the generator. In this type of hybrid vehicle, the power of the internal combustion engine is divided by a power dividing mechanism made of e.g. a planetary gear, into the rotating shaft of the generator and a drive shaft coupled with an axle.

In this type of hybrid vehicle, in order to increase the transmission efficiency of energy from the internal combustion engine to the drive shaft, there is known such a technology that if a target drive torque to be outputted to the drive shaft is less than the maximum output torque of the internal combustion engine, the rotating shaft of the generator is mechanically locked to mechanically and directly connect the drive shaft and the output shaft of the internal combustion engine. According to the technology, the power of the internal combustion engine can be directly outputted to the drive shaft without through the generator and the electric motor, so that it can eliminate the occurrence of an energy loss in the generator and the electric motor and can increase the transmission efficiency. For example, a patent document 1 or the like discloses a technology in which if the mechanical lock of the rotating shaft of the generator is unintentionally released, the mechanical lock of the generator is uniformly forbidden after the release. Moreover, a patent document 3 or the like discloses a technology in which if it is detected that foreign substances enter in an oil control valve (OCV) for controlling a valve of the internal combustion engine, an electric current applied to the OCV is alternately changed between the maximum current and the minimum current to flush out the foreign substances with hydraulic oil by an oil pump.

Patent document 1: Japanese Patent Application Laid Open No. 2004-345527

Patent document 2: Japanese Patent Application Laid Open No. 2002-51407

Patent Document 3: Japanese Patent Application Laid Open No. 2001-234768

DISCLOSURE OF INVENTION

Subject to be Solved by the Invention

However, according to the aforementioned patent document 1 or the like, there is such a technical problem that the mechanical lock and the release of the lock of the rotating shaft of the generator are not likely appropriately performed as foreign substances are mixed into a mechanical locking mechanism of the generator in the hybrid vehicle.

Specifically, the locking mechanism of the generator is lubricated and cooled by the circulation of oil in the locking mechanism. Mixed with the circulated oil, the foreign substances such as iron powder likely mix into the locking mechanism of the generator. In addition, there is a possibility that the foreign substances such as abraded iron powder are generated by the operations of constituents such as a slide part, a rotation part, a support part, or a press part in the locking mechanism of the generator. Moreover, the foreign substances likely accumulate in a connection part of each constituent in the locking mechanism of the generator.

These foreign substances are caught in the slide part and the like in the locking mechanism of the generator and change a frictional coefficient between the rotation part and the support part. Thus, unintentional lock is performed in the locking mechanism of the generator, and the lock is unintentionally released, so that the mechanical lock and the release of the lock of the rotating shaft of the generator are not likely appropriately performed, which is technically problematic. Therefore, due to the unintentional lock and the unintentional release of the lock, the improvement in transmission efficiency and fuel efficiency is likely prevented in the hybrid vehicle, which is also technically problematic.

In view of the aforementioned problems, it is therefore an object of the present invention to provide a driving control apparatus and method of a hybrid vehicle in which the mechanical lock and the release of the lock of the rotating shaft of the generator can be appropriately performed.

Means for Solving the Subject

The above object of the present invention can be achieved by a driving control apparatus of a hybrid vehicle provided with: an internal combustion engine; a generator capable of performing power generation by power of the internal combustion engine and capable of charging a storage battery with electric power obtained by the power generation; a power dividing mechanism for dividing the power of the internal combustion engine into a drive shaft and a rotating shaft of the generator; an electric motor capable of outputting power according to electric power supplied from at least one of the generator and the storage battery, to the drive shaft; a changing device capable of changing an operating state of the generator, from one state to the other state out of a first state in which the rotating shaft of the generator can rotate and a second state in which the rotating shaft of the generator is fixed in a stop state; and a controlling device for controlling the changing device to change the operating state of the generator from the one state to the other state in a predetermined period in which the rotating shaft of the generator does not rotate.

According to the driving control apparatus of the hybrid vehicle in the present invention, the hybrid vehicle as its control target is provided with the generator, the power dividing mechanism and the storage battery, in addition to the electric motor and the internal combustion engine as the power source. The electric motor includes, for example, a motor or a motor generator. The generator includes, for example, a generator or a motor generator. The power dividing mechanism includes, for example, a planetary gear and divides the power of the internal combustion engine into the rotating shaft of the generator and the drive shaft coupled with e.g. an axle. The electric power generated by the generator is supplied to the electric motor or is used to charge the storage battery.

This hybrid vehicle is provided with the changing device capable of changing the operating state of the generator, from one state to the other state out of the first state in which the rotating shaft of the generator can rotate (i.e. rotatable state) and the second state in which the rotating shaft of the generator is fixed in a stop state (i.e. fixed state).

The "operating state of the generator" of the present invention means the operations or state of the generator or a device capable of restricting the rotational state of the generator, including the meaning of the operations or state of a device capable of physically or mechanistically restricting the rotational state of the generator, in addition to the meaning of the rotational operation, rotational state, stop operation and stop state of the generator. The operation state of the device capable of restricting the rotational state of the generator typically means whether or not the engaging device engages with one portion of the hybrid vehicle and means an engagement operation when the engaging device engages with the aforementioned one portion or an engagement state of the engagement.

By the changing device changing the operating state to the first state in which the rotating shaft of the generator can rotate, the power of the internal combustion engine is divided into and outputted to the rotating shaft of the generator and the drive shaft. On the other hand, by the changing device changing the operating state to the second state in which the rotating shaft of the generator is fixed in the stop state, the power of the internal combustion engine is directly outputted to the drive shaft via the power dividing mechanism without through the generator. The changing device typically means the engaging device capable of braking the rotation of the generator by engaging with one portion of the hybrid vehicle equipped with the internal combustion engine. More specifically, as the changing device, there can be exemplified a clutch capable of mutually changing various power transmission states by an operation of engagement, release, slip, or the like (i.e. docking change mechanism) and a transmission for controlling a ratio between the rotational speed of an input member and the rotational speed of an output member. As the transmission, there can be exemplified a transmission capable of changing a transmission gear ratio in a stepwise manner (i.e. discontinuously) and a transmission capable of changing the transmission gear ratio in a stepless manner (i.e. continuously). As the clutch, there can be exemplified a friction clutch, a hydraulic clutch, or an electromagnetic clutch.

In particular, the operating state of the generator is changed from one state to the other state in the predetermined period in which the rotating shaft of the generator does not rotate, by the changing device under the control of the controlling device. Here, the predetermined period of the present invention means a period in which the rotating shaft of the generator does not rotate substantially, and it means a period including a moment in which the rotating shaft of the generator slowly starts to rotate as that the rotating shaft of the generator does not rotate substantially.

Moreover, typically, the operating state of the generator may be changed only once from one state to the other state, or after the operating state of the generator may be changed from one state to the other state, the operating state of the generator may be changed from the other state to the one state. Alternatively, continuous change may be performed in which after the operating state of the generator may be changed from one state to the other state, the operating state of the generator is continuously changed from the other state to the one state. Alternatively, this continuous change may be performed the predetermined number of times per unit time.

By this, it is possible to preliminarily perform the change in the operating state of the generator by the changing device in the predetermined period in which the rotating shaft of the generator does not rotate and to exert a physical action on causative substances which cause a failure in the change. Typically, it is possible to exert a physical force on foreign substances which exist in a space between one portion of the hybrid vehicle and the engaging device and which cause a failure when the engaging device engages with one portion of the hybrid vehicle or when the engagement is released, and to remove the foreign substances from the engaging device.

By this, it is possible to effectively reduce the influence of the causative substances which cause the failure in the change and to effectively prevent the occurrence of the failure in the change in the operating state of the generator.

By this, it is possible to change between the first state in which the rotating shaft of the generator can rotate and the second state in which the rotating shaft of the generator is fixed in the stop state, while almost or completely preventing the occurrence of the failure in the change, thereby remarkably improving the transmission efficiency and fuel efficiency in the driving control apparatus of the hybrid vehicle.

In addition, it is unnecessary to add a new part in order to exert a physical action on the causative substances which cause the failure in the change, so that the driving control apparatus of the hybrid vehicle can be realized at lost cost.

Even if the operating state of the generator is fixed into the one state or the other state due to the preliminary change in the operating state, it is possible to effectively reduce a sense of discomfort given to a driver because the change is performed before an actual change to be in a desired state.

In one aspect of the driving control apparatus of the hybrid vehicle in the present invention, the controlling device controls the changing device to change the operating state of the generator from the first state to the second state, in a period in which the operating state of the generators is the first state and in which the rotating shaft of the generator does not rotate, as the predetermined period.

According to this aspect, the operating state is changed from the first state in which the rotating shaft of the generator can rotate to the second state in which the rotating shaft of the generator is fixed in the stop state, so that it is possible to more considerably exert a physical action such as an impact force, on the causative substances which cause the failure in the change. As a result, it is possible to reduce the influence of the causative substances which cause the failure in the change more effectively and to prevent the occurrence of the failure in the change in the operating state of the generator more effectively.

In another aspect of the driving control apparatus of the hybrid vehicle in the present invention, the controlling device controls the changing device to perform continuous change in which the operating state of the generator is changed from the other state to the one state after the operating state of the generator is changed from the one state to the other state, in the predetermined period.

According to this aspect, the first state in which the rotating shaft of the generator can rotate and the second state in which the rotating shaft of the generator is fixed in the stop state are continuously changed, so that it is possible to more considerably exert a physical action such as an impact force, on the causative substances which cause the failure in the change. As a result, it is possible to reduce the influence of the causative substances which cause the failure in the change more effectively and to prevent the occurrence of the failure in the change in the operating state of the generator more effectively.

In another aspect of the driving control apparatus of the hybrid vehicle in the present invention, the controlling device controls the changing device to perform the continuous change twice or more, in the predetermined period.

According to this aspect, the continuous change between the first state in which the rotating shaft of the generator can rotate and the second state in which the rotating shaft of the generator is fixed in the stop state is performed multiple times, so that it is possible to more considerably exert a physical action such as an impact force, on the causative substances which cause the failure in the change. As a result, it is possible to reduce the influence of the causative substances which cause the failure in the change more effectively and to prevent the occurrence of the failure in the change in the operating state of the generator more effectively.

In another aspect of the driving control apparatus of the hybrid vehicle in the present invention, the controlling device controls the changing device to change the operating state of the generator from the one state to the other state, in a period including a time point at which the rotating shaft of the generator starts to rotate, as the predetermined period.

According to this aspect, it is possible to exert a centrifugal force of the generator or vibration generated on the generator generated when the rotating shaft of the generator starts to rotate, as a physical action, on the causative substances which cause the failure in the change. As a result, it is possible to remove the causative substances which cause the failure in the change, from the engaging device, to reduce the influence of the causative substances more effectively and to prevent the occurrence of the failure in the change in the operating state of the generator more effectively.

In another aspect of the driving control apparatus of the hybrid vehicle in the present invention, the driving control apparatus of the hybrid vehicle is provided with an engaging device capable of braking rotation of the generator by engaging with one portion of the hybrid vehicle equipped with the internal combustion engine, as the changing device, and the controlling device controls the engaging device to change the operating state of the generator from one state to the other state out of the first state (i.e. rotatable state or release state) in which the rotating shaft of the generator can rotate by the engaging device becoming in a non-engagement state in which the engaging device does not engage with the one portion, and the second state (i.e. fixed state or engagement state) in which the rotating shaft of the generator is stopped by the engaging device becoming in an engagement state in which the engaging device engages with the one portion, in the predetermined period.

According to this aspect, the engaging device may be in one of the engagement state and the non-engagement state by being biased by a biasing force such as an electromagnetic force or a hydraulic force. Alternatively, the engaging device may be in the other of the engagement state and the non-engagement state by being not biased by the biasing force.

By this, it is possible to preliminarily perform the change in the operating state of the generator by the engaging device in the predetermined period in which the rotating shaft of the generator does not rotate, to exert a physical force on foreign substances which exist in a space between one portion of the hybrid vehicle and the engaging device and which cause a failure when the engaging device engages with one portion of the hybrid vehicle or when the engagement is released, and to remove the foreign substances from the engaging device.

By this, it is possible to effectively reduce the influence of the causative substances which cause the failure in the change and to effectively prevent the occurrence of the failure in the change in the operating state of the generator.

By this, it is possible to change between the first state in which the rotating shaft of the generator can rotate and the second state in which the rotating shaft of the generator is fixed in the stop state, while almost or completely preventing the occurrence of the failure in the change, thereby remarkably improving the transmission efficiency and fuel efficiency in the driving control apparatus of the hybrid vehicle.

In another aspect of the driving control apparatus of the hybrid vehicle in the present invention, the controlling device controls the engaging device to perform a pair operation the predetermined number of times per unit time in the predetermined period, the pair operation being performed in pairs made by an engagement operation of changing a state from the non-engagement state to the engagement state and a non-engagement operation of changing a state from the engagement state to the non-engagement state.

According to this aspect, the pair operation is performed the predetermined number of times per unit time, so that it is possible to more considerably exert a physical action such as an impact force, on the causative substances which cause the failure in the change. Here, the predetermined number of times per unit time in the present invention, i.e. frequency, means the number of times per unit time for further increasing the physical action. The predetermined number of times per unit time may mean (i) the weight of the engaging device, (ii) a mechanistic or mechanical elastic modulus of the engaging device in the state change from the non-engagement state to the engagement state or in the state change from the engagement state to the non-engagement state, or (iii) a resonant frequency based on the weight of the engaging device and the mechanistic or mechanical elastic modulus of the engaging device.

As a result, it is possible to remove the causative substances which cause the failure in the change more effectively and to prevent the occurrence of the failure in the change in the operating state of the generator more effectively.

In another aspect of the driving control apparatus of the hybrid vehicle in the present invention, the driving control apparatus of the hybrid vehicle is provided with a first motor generator as the generator, the driving control apparatus of the hybrid vehicle is provided with a second motor generator as the electric motor, and the controlling device controls the changing device to change the operating state of the generator from the one state to the other state, in a period including a time point at which cranking for starting the internal combustion engine is started by the first motor generator or the second motor generator, as the predetermined period.

According to this aspect, it is possible to exert a centrifugal force of the first or second motor generator or vibration generated on the first or second generator generated when the cranking for starting the internal combustion engine is started by the first motor generator or the second motor generator, as a physical action, on the causative substances which cause the failure in the change. As a result, it is possible to remove the causative substances which cause the failure in the change, from the engaging device, to reduce the influence of the causative substances more effectively and to prevent the occurrence of the failure in the change in the operating state of the generator more effectively.

In another aspect of the driving control apparatus of the hybrid vehicle in the present invention, the driving control apparatus of the hybrid vehicle is provided with a first motor generator as the generator, the driving control apparatus of the hybrid vehicle is provided with a second motor generator as the electric motor, and the controlling device controls the changing device to change the operating state of the generator from the one state to the other state, in a period including a time point at which power according to electric power starts to output to the drive shaft by the first motor generator or the second motor generator, as the predetermined period.

According to this aspect, it is possible to exert a centrifugal force of the first or second motor generator or vibration generated on the first or second generator generated when the power according to the electric power starts to output to the drive shaft by the first motor generator or the second motor generator, as a physical action, on the causative substances which cause the failure in the change. As a result, it is possible to remove the causative substances which cause the failure in the change, from the engaging device, to reduce the influence of the causative substances more effectively and to prevent the occurrence of the failure in the change in the operating state of the generator more effectively.

In another aspect of the driving control apparatus of the hybrid vehicle in the present invention, the driving control apparatus of the hybrid vehicle is further provided with an oil control valve for controlling circulation of oil, which can conduct heat generated by an engagement operation of changing a state from the non-engagement state to the engagement state and a non-engagement operation of changing a state from the engagement state to the non-engagement state and which can lubricate the engagement operation and the non-engagement operation, and the controlling device allows the oil control valve to circulate the oil in addition to controlling the changing device to change the operating state of the generator from the one state to the other state, in the predetermined period.

According to this aspect, it is possible to effectively exert a viscous force by the oil circulated by the oil control valve, as a physical action, on the causative substances which cause the failure in the change. As a result, it is possible to effectively remove the causative substances which cause the failure in the change, from the engaging device, and to prevent the occurrence of the failure in the change in the operating state of the generator more effectively.

In another aspect of the driving control apparatus of the hybrid vehicle in the present invention, the controlling device allows the oil control valve to change a circulation time to circulate the oil, depending on a temperature of the oil, in addition to or instead of increasing circulation amount of the oil by using the oil control valve, in the predetermined period.

According to this aspect, it is possible to effectively exert a viscous force by the oil circulated by the oil control valve, as a physical action, on the causative substances which cause the failure in the change, depending on the increased circulation amount and circulation time of the oil. As a result, it is possible to remove the causative substances which cause the failure in the change, from the engaging device more effectively and to prevent the occurrence of the failure in the change in the operating state of the generator more effectively.

In another aspect of the driving control apparatus of the hybrid vehicle in the present invention, the controlling device allows the oil control valve to circulate the oil in the vicinity of the engaging device, before controlling the changing device to change the operating state of the generator from the one state to the other state, in the predetermined period.

According to this aspect, it is possible to exert a physical force on the causative substances which exist in the vicinity of the engaging device and to effectively remove the causative substances from the engaging device.

Typically, for example, if the oil circulation is started by the oil control valve after the driving control apparatus of the hybrid vehicle is stopped for several hours, foreign substances caught on an oil filter immediately after the start of the oil circulation are highly likely set free within an oil system. Thus, it is desirable to circulate the oil to the degree that the entire oil in the space between the engaging device and one portion of the hybrid vehicle is replaced and to catch the foreign substances by using the oil filter before performing the foreign substance removal by the change in the operating state of the generator described above.

The above object of the present invention can be also achieved by a driving control method of a hybrid vehicle in a driving control apparatus of a hybrid vehicle provided with: an internal combustion engine; a generator capable of performing power generation by power of the internal combustion engine and capable of charging a storage battery with electric power obtained by the power generation; a power dividing mechanism for dividing the power of the internal combustion engine into a drive shaft and a rotating shaft of the generator; an electric motor capable of outputting power according to electric power supplied from at least one of the generator and the storage battery, to the drive shaft; and a changing device capable of changing an operating state of the generator, from one state to the other state out of a first state in which the rotating shaft of the generator can rotate and a second state in which the rotating shaft of the generator is fixed in a stop state, the method provided with: a controlling process of controlling the changing device to change the operating state of the generator from the one state to the other state in a predetermined period in which the rotating shaft of the generator does not rotate.

According to the driving control method of the hybrid vehicle in the present invention, it is possible to receive various benefits of the driving control apparatus of the hybrid vehicle in the present invention described above. Incidentally, in response to various aspects of the driving control apparatus of the hybrid vehicle in the present invention described above, the driving control method of the hybrid vehicle in the present invention can also adopt various aspects.

The operation and other advantages of the present invention will become more apparent from the best mode for carrying out the invention explained below.

BEST MODE FOR CARRYING OUT THE INVENTION

Hereinafter, various preferred embodiments of the present invention will be explained with reference to the drawings.

First Embodiment (Basic Structure)

Figure 1:
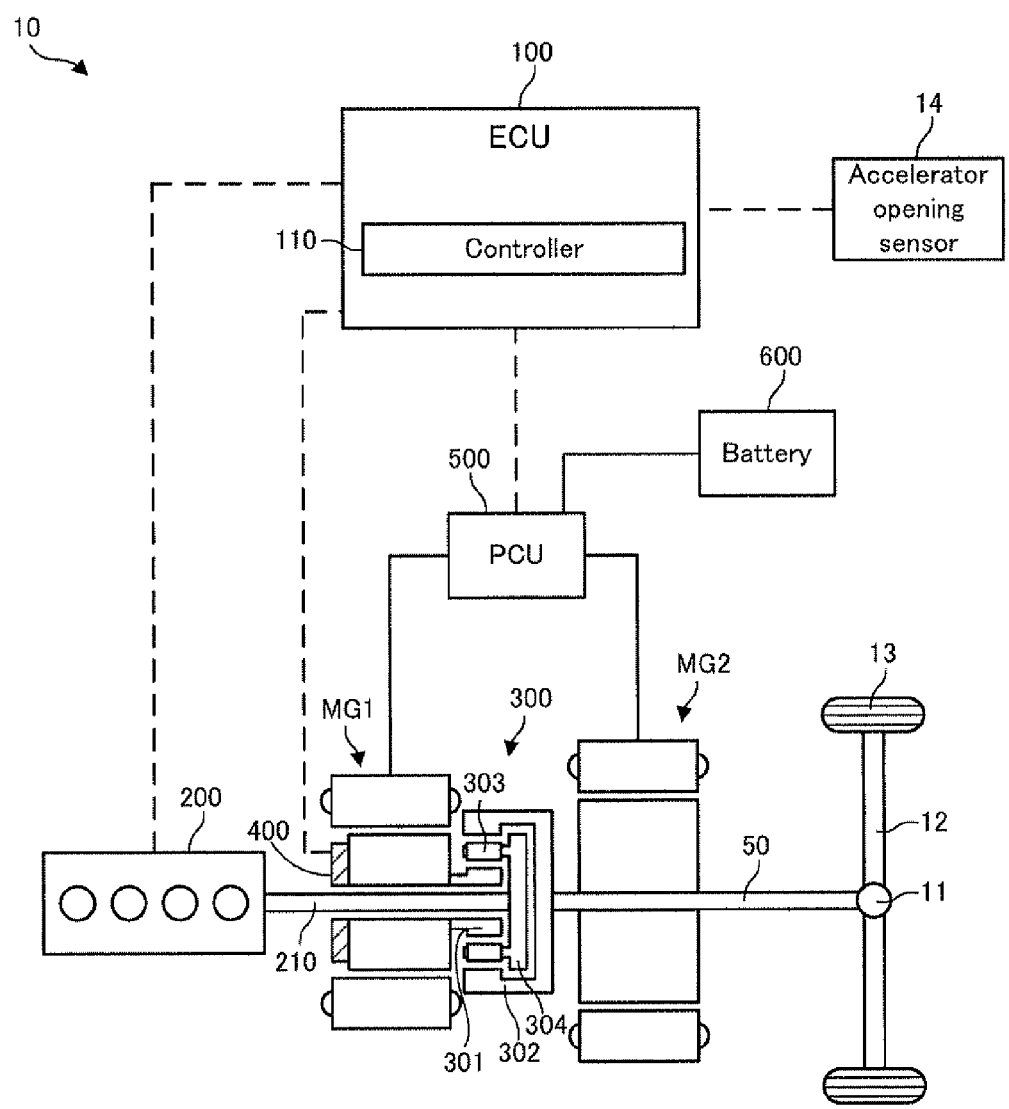
FIG. 1 is a block diagram conceptually showing the structure of a driving control apparatus of a hybrid vehicle in a first embodiment.

The structure of a driving control apparatus of a hybrid vehicle in a first embodiment will be explained with reference to FIG. 1. FIG. 1 is a block diagram conceptually showing the structure of the driving control apparatus of the hybrid vehicle in the first embodiment.

In FIG. 1, a hybrid vehicle 10 in the first embodiment is provided with an engine 200, a first motor generator MG1 (hereinafter abbreviated as a "MG1" as occasion demands), a second motor generator MG2 (hereinafter abbreviated as a "MG2" as occasion demands), a drive shaft 50, a power dividing mechanism 300, a locking mechanism 400, a PCU (Power Control Unit) 500, a battery 600, a reduction gear 11, an axle 12, wheels 13, an accelerator opening sensor 14, and an ECU 100.

The engine 200 is a gasoline engine as one example of the "internal combustion engine" of the present invention, and it can function as a main power source of the hybrid vehicle 10. A crankshaft 210 as the output shaft of the engine 200 is coupled with a carrier 304 of the power dividing mechanism 300 described later. Incidentally, the "internal combustion engine" of the present invention includes, for example, two-cycle or four-cycle reciprocating engine or the like and has at least one cylinder, and it includes in effect a mechanism which can extract a force generated in the combustion of a fuel-air mixture including various fuel such as gasoline, light oil or alcohol, as power via a physical or mechanical transmitting device such as a piston, a connecting rod and a crankshaft as occasion demands, in a combustion chamber within the cylinder.

The first motor generator MG1 is a motor generator as one example of the "generator" of the present invention, and it can perform mainly power generation for charging the battery 500, or for supplying electric power to the second motor generator MG2, due to the rotation of the rotating shaft of the first motor generator MG1 by receiving the supply of a torque from the engine 200.

The second motor generator MG2 is a motor generator as one example of the "electric motor" of the present invention, and it can function as an electric motor for supporting (i.e. assisting) the power of the engine 200 or a generator for charging the battery 600. More specifically, the second motor generator MG2 is an apparatus for assisting a driving force or a braking force. If assisting the driving force, the second motor generator MG2 functions as the electric motor by being supplied with electric power from at least one of the first motor generator MG1 and the battery 600, and if assisting the braking force, the second motor generator MG2 functions as the generator for generating electric power by being rotated by a torque transmitted from the wheel 13 side of the hybrid vehicle 10. The rotating shaft of the second motor generator MG2 is coupled with the drive shaft 50 so as to supply power to the drive shaft 50.

The drive shaft 50 is coupled with the axle 12, which is coupled with the wheels 13 as the wheels of the hybrid vehicle 10, via the reduction gear 11 including various reduction gear apparatuses such as a differential.

The power dividing mechanism 300 includes a planetary gear (or planetary gear mechanism), and it can divide or distribute the power of the engine 200 into the drive shaft 50 and the rotating shaft of the first motor generator MG1. More specifically, the power dividing mechanism 300 is provided with a sun gear 301 as an external gear; a ring gear 302 as an internal gear, disposed concentrically with the sun gear 301; a pinion gear 303 meshing with the sun gear 301 and the ring gear 302; and a carrier 304 holding the pinion gear 303 so that the pinion gear 303 can arbitrarily rotate and revolve. The power dividing mechanism 300 is constructed such that the sun gear 301, the ring gear 302 and the carrier 304 can mutually provide a differential action as three rotational elements. The crankshaft 210 as the output shaft of the engine 200 is coupled with the carrier 304. The rotating shaft of the first motor generator MG1 is coupled with the sun gear 301. The drive shaft 50 is coupled with the ring gear 302. The power dividing mechanism 300 distributes the power from the engine 200 inputted from the carrier 304, to the sun gear 301 side (i.e. the first motor generator MG1 side) and the ring gear 302 side (i.e. the drive shaft 50 side), according to its gear ratio.

The locking mechanism 400 is one example of the "changing device" of the present invention, and it can mechanically fix the rotating shaft of the first motor generator MG1 in a stop state (i.e. lock the first motor generator MG1). At the same time, the locking mechanism 400 can release the rotating shaft of the first motor generator MG1 in a rotatable state (i.e. release the lock of the first motor generator MG1).

Specifically, if the first motor generator MG1 is locked by the locking mechanism 400, the power from the engine 200 is not distributed to the first motor generator MG1 by the power dividing mechanism 300 but outputted to the drive shaft 50. At this time, typically, the second motor generator MG2 is stopped, and only the driving force from the engine 200 is transmitted to the drive shaft 50 (i.e. the hybrid vehicle 10 drives only by the driving force outputted from the engine 200). More specifically, for example, if a request driving force or an engine load is small, the rotation of the first motor generator MG1 may be interrupted by the locking mechanism 400 to set a practical gear ratio of the power driving mechanism 300. In other words, the number of revolutions of the engine is suppressed to be as low as possible. In this case, in the power dividing mechanism 300, the power generation by the first motor generator MG1 is not performed, and the first motor generator MG1 does not function as the electric motor, either. Therefore, the electric power is not consumed as it is unnecessary to generate electric power on the second motor generator for electric supply to the first motor generator MG2, or it is unnecessary to supply electric power to the first motor generator MG1 from the battery. In other words, the power is not circuited in a lock state set in this manner, which can prevent or suppress power loss and its attendant deterioration in fuel consumption. Incidentally, the locking mechanism may be any type of mechanism such as a cam-type mechanism, a docking mechanism, a comb-like mechanism, and AT, as described later.

The PCU 500 includes an inverter or the like which can convert direct current (DC) power extracted from the battery 600 to alternating current (AC) power and supply it to the first motor generator MG1 and the second motor generator MG2 and which can convert AC power generated by the first motor generator MG1 and the second motor generator MG2 to DC power and supply it to the battery 600. The PCU 500 is a control unit which can individually control the input and output of electric power between the battery 600 and each motor generator. The PCU 500 is electrically connected to the ECU 100, and the operations of the PCU 500 are controlled by the ECU 100.

The battery 600 is a chargeable storage battery which can function as a power supply source for supplying electric power to the first motor generator MG1 and the second motor generator MG2.

The accelerator opening sensor 14 is a sensor which can detect an accelerator opening degree as the operation amount of an accelerator pedal (not illustrated) of the hybrid vehicle 10. The accelerator opening sensor 14 is electrically connected to the ECU 100, and the detected accelerator opening degree is gauged by the ECU 100 with a constant or irregular period.

The ECU 100 is an electric control unit which is provided with a CPU (Central Processing Unit), a ROM (Read Only Memory), a RAM (Random Access Memory) or the like and which can control all the operations of the hybrid vehicle 10. The ECU 100 is one example of the "driving control apparatus of the hybrid vehicle" of the present invention. The ECU 100 is an electric control unit which is provided with a CPU (Central Processing Unit), a ROM (Read Only Memory), a RAM (Random Access Memory) or the like and which can control all the operations of the engine 200.

A controller 110 constitutes one portion of the ECU 100, and it can control the locking mechanism 400 in accordance with a target drive torque determined in accordance with the accelerator opening degree detected by the accelerator opening sensor 14 and the number of revolutions of the drive shaft (i.e. drive shaft rotational speed) as the number of revolutions of the drive shaft 50. In addition, the controller 110 can control the locking mechanism 400 in accordance with the rotational speed of the engine, the rotational speed of the first motor generator MG1 and the rotational speed of the second motor generator MG2, in addition to the target drive torque and the drive shaft rotational speed. Incidentally, the control of the locking mechanism 400 by the ECU 100 including the controller will be explained later in detail with reference to FIG. 6.

(Basic Configuration of Supply System for Lubricant Oil Supplied to Locking Mechanism)

Figure 2:
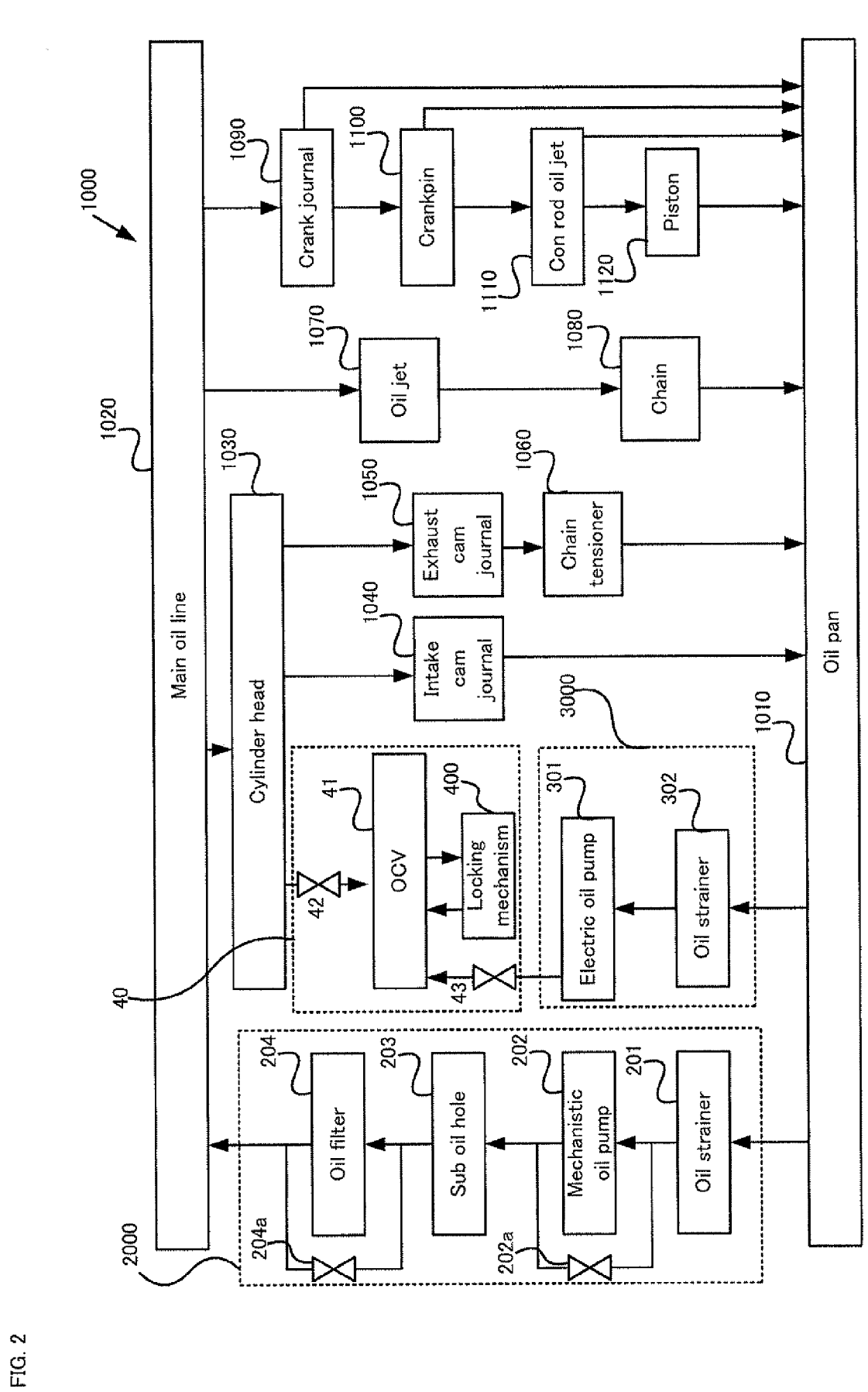
FIG. 2 is a block diagram schematically showing the basic configuration of a supply system for lubricant oil supplied to a locking mechanism in the first embodiment.

Next, with reference to FIG. 2, an explanation will be given on the basic configuration of a supply system for lubricant oil supplied to the locking mechanism in the first embodiment. FIG. 2 is a block diagram schematically showing the basic configuration of the supply system for the lubricant oil supplied to the locking mechanism in the first embodiment.

As shown in FIG. 2, the supply system for the lubricant oil supplied to the locking mechanism in the first embodiment is provided broadly with a lubricating system 1000 for lubricating the lubricant oil (hereinafter referred to oil as occasion demands); a mechanistic pump system 2000 capable of changing the hydraulic pressure of the oil by the power of the internal combustion engine; a cooling and lubricating system 40 including the locking mechanism 400; and an electric pump system 3000 capable of changing the hydraulic pressure of the oil by a motorized force which does not depend on the power of the internal combustion engine.

The lubricating system 1000 is provided with an oil pan 1010, a main oil line 1020, a cylinder head 1030, an intake cam journal 1040, an exhaust cam journal 1050, a chain tensioner 1060, an oil jet 1070, a chain 1080, a crank journal 1090, a crankpin 1100, a con rod oil jet 1110, and a piston 1120. As for the constituents which constitute the lubricating system 1000, the explanation of each constituent will be omitted because known elements can be used.

The mechanistic pump system 2000 is provided with an oil strainer 201, a mechanistic oil pump 202, a pressure regulating valve 202a, a sub oil hole 203, an oil filter 204, and a pressure regulating valve 204a.

The mechanistic oil pump 202 supplies the lubricant oil for lubricating and cooling the locking mechanism 400 to an oil control valve 41 in addition to the circulation of the lubricant oil in the lubricating system 1000. By this, the locking mechanism 400 can be lubricated and cooled. In particular, the pressure regulating valve 202a regulates the pressure on the outflow side and the inflow side of the mechanistic pump 202. Moreover, the pressure regulating valve 204a regulates the pressure on the outflow side and the inflow side of the oil filter 204.

The cooling and lubricating system 40 is provided with the locking mechanism 400, the oil control valve 41, a control valve 42, and a control valve 43.

The oil control valve 41 changes a retention space for the lubricant oil supplied to change valve characteristics. Typically, the oil control valve 41 is a hydraulic valve for lubricating and cooling the locking mechanism 400.

If opened, the control valve 42 supplies the lubricant oil to the oil control valve 41 via the main oil line 102 and the cylinder head 103 by the mechanistic pump system 2000. On the other hand, if closed, the control valve 42 does not supply the lubricant oil to the oil control valve 41.

If opened, the control valve 43 supply the lubricant oil to the oil control valve 41 by the electric pump system 3000 described later. On the other hand, if closed, the control valve 43 does not supply the lubricant oil to the oil control valve 41.

The electric pump system 3000 is provided with an electric oil pump 301 and an oil strainer 302. The electric oil pump 301 supplies the lubricant oil for lubricating and cooling the locking mechanism 400 to the oil control valve 41, for example, at the start of the internal combustion engine.

The electric oil pump 301 is not influenced by the number of revolutions of the internal combustion engine in comparison with the mechanistic oil pump 202, so that the lubricant oil for lubricating and cooling the locking mechanism 400 can be supplied to the oil control valve 41, more highly accurately and stably.

The controller 110 changes the supply amount (or circulation amount) or supply time (or circulation time) of the lubricant oil for lubricating and cooling the locking mechanism 400 by using the oil control valve 41, thereby removing foreign substances which exist in the vicinity of an engaging device such as a docking clutch, within the locking mechanism 400.

(Operations of Locking Mechanism)

Now, with reference to FIG. 3 and FIG. 4, an explanation will be given on the operations of the locking mechanism of the MG1 including a case where the release error of the MG1 lock occurs. Incidentally, in the first embodiment, for example, the locking mechanism of an electromagnetic cam type is explained; however, the present invention may be applied to a comb-like engagement docking apparatus. Alternatively, the present invention may be applied to a friction clutch apparatus using a friction force. Alternatively, the present invention may be applied to another type of clutch apparatus such as a wetmultiple clutch apparatus.

Figure 3:
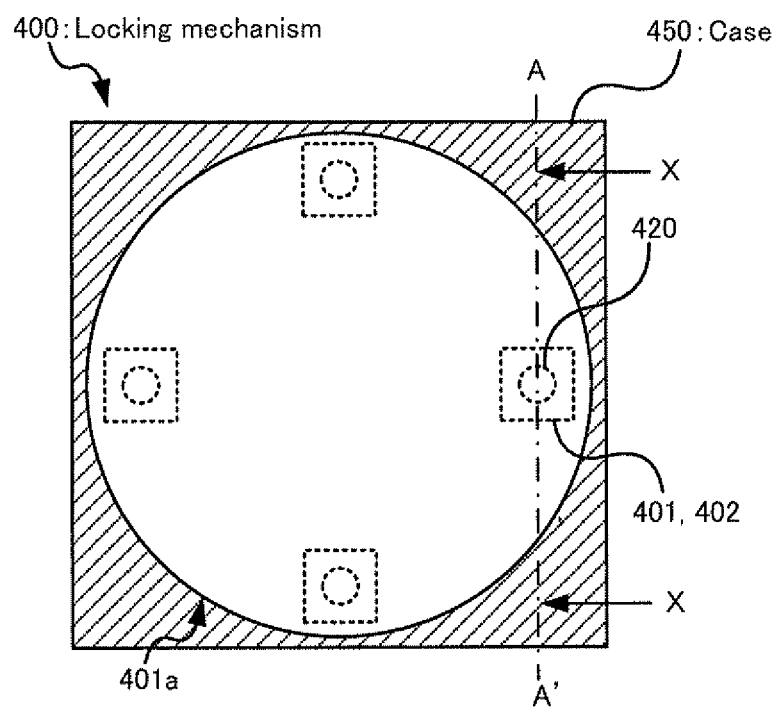
FIG. 3 is an outside plan view schematically showing the appearance of a MG1 locking mechanism in the first embodiment.

FIG. 3 is an outside plan view schematically showing the appearance of the MG1 locking mechanism in the first embodiment. FIG. 4 are a cross sectional view schematically showing one cross section at the time of releasing the MG1 lock in the MG1 locking mechanism in the first embodiment (FIG. 4(*a*)) and a cross sectional view schematically showing one cross section at the time of performing the MG1 lock. Incidentally, the cross sections in FIG. 4(*a*) and FIG. 4(*b*) are cross sections viewed from arrows X, with a segment A-A' in FIG. 3 as a section.

(Basic Structure of Locking Mechanism)

Figure 4:
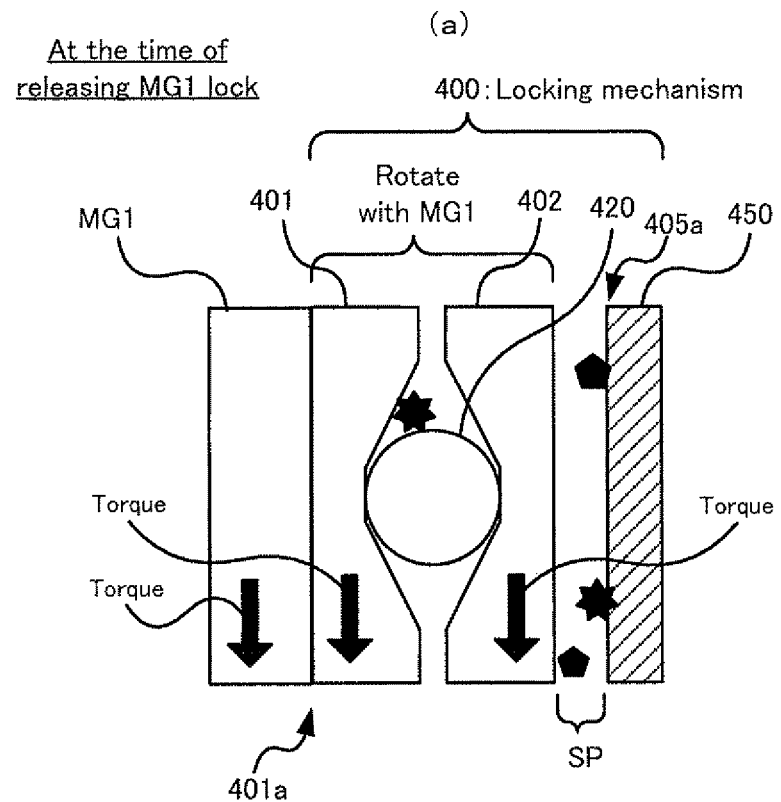
FIG. 4 are a cross sectional view schematically showing one cross section at the time of releasing a MG1 lock in the MG1 locking mechanism in the first embodiment (FIG. 4(*a*)) and a cross sectional view schematically showing one cross section at the time of performing the MG1 lock.
Figure 4:
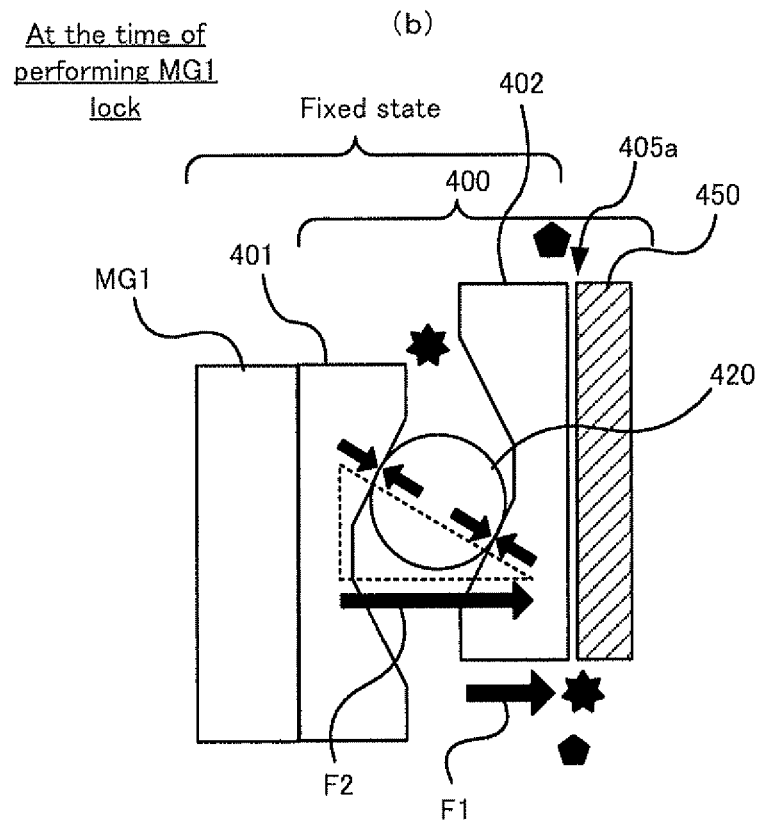

As shown in FIG. 3, FIG. 4(*a*) and FIG. 4(*b*), the locking mechanism 400 of the MG1 is provided with a member 401, a member 402, a ball 420, and a case 450. In particular, each of black stars and black pentagons which exist, for example, in a space SP in FIG. 4(*a*) or FIG. 4(*b*) conceptually indicates a foreign substance included in the lubricant oil within the locking mechanism 400.

The member 401 is fixed to the MG1 via a plane 401*a*, and it can rotate with the MG1.

The member 402 is subjected to a biasing force directed to a friction surface 450*a* side of the case 450 which is fixed from the MG1 side to the hybrid vehicle in a resting state, for example, by an electromagnetic force or the like (refer to a direction from the right to the left in FIG. 4(*a*) and FIG. 4(*b*)). By this, the member 402 is displaced to the friction surface 450*a* of the case 450 from the MG1 side and is adsorbed onto the friction surface 450*a* by the contact with the friction surface 450*a*. This rotates a cam mechanism within the locking mechanism 400 and generates a fixing torque for the rotating shaft of the MG1. By this, the rotating shaft of the MG1 can be fixed in the stop state.

The ball 420 is a spherical rigid body, is disposed between the member 401 and the member 402, and can apply a biasing force to the member 401 and the member 402.

(Release State of Locking Mechanism)

As shown in FIG. 4(*a*), if the MG1 lock is released, there is the space SP between the member 402 and the case 450, which is fixed to the hybrid vehicle in the resting state, in the locking mechanism 400, and the ball 420 and the member 402 rotate with the MG1 as in the member 401. Incidentally, arrows in FIG. 4(*a*) show the rotational directions of the member 401, the member 402 and the MG1.

In other words, in the locking mechanism 400, the member 402 does not engage with the case 450, and with that, the member 401 and the ball 420 become into a non-engagement state in which the member 401 and the ball 420 do not engage, and therefore, the rotatable state or release state in which the rotating shaft of the MG1 can rotate (i.e. one example of the "first state" of the present invention) is formed.

(Engagement State of Locking Mechanism)

As shown in FIG. 4(*b*), if the MG1 lock is performed, the member 402 is subjected to a first biasing force F1, which is directed to the case 450 from the MG1 side, and is fixed in an adsorption state by a friction force generated in the contact with the friction surface 450*a* of the case 450. Incidentally, typically, the first biasing force F1 may be an electromotive force generated for the member 402 having magnetism, by a drive current for locking the MG1 flowing on the case 450 side.

The member 402 is subjected to a second biasing force F2, which is a mechanistic force generated by pressing the member 420 to the case 450 side via the ball 420 from the member 401, in addition to the first biasing force F1, and it is fixed in the adsorption state by the friction force generated in the contact with the friction surface 450*a* of the case 450. By this, the ball 420 and the member 402 stop the rotation of the member 401, and the MG1 lock is normally performed by stopping the rotation of the MG1.

In other words, in, the locking mechanism 400, the member 402 comes in contact with the friction surface 450*a* of the case 450 and stops by the friction force, and with that, the operations of the member 401 stops via the ball 420. By this, the member 401, the member 420 and the ball 420 become into an engagement state in which the member 401, the member 420 and the ball 420 engage with the case 450. In other words, in the locking mechanism 400, due to the engagement state in which the member 401, the member 420 and the ball 420 engage with the case 450, a fixed state or engagement state in which the rotating shaft of the MG1 stops (i.e. one example of the "second state" of the present invention) is formed. As described above, the member 401, the member 402 and the ball 420 constitute one portion of the "engaging device" of the present invention. The case 450 constitutes one example of the "one portion of the hybrid vehicle" of the present invention.

In particular, the locking mechanism 400 can efficiently and simply increase the biasing force for pressing the MG1 onto the friction surface 450*a* of the case 450 via the member 401, the member 402 and the ball 420, by being provided with the member 401, the member 402 and the ball 420 and by generating the second biasing force F2, which is the aforementioned mechanistic force, in addition to the first biasing force F1, which is an electromagnetic force. By this, in comparison with a case where the MG1 is locked only by the first biasing force F1, it is possible to efficiently and simply increase the fixing torque for fixing the rotating shaft of the MG1 in the stop state.

In other words, it is possible to remove foreign substances which exist between the member 401, the member 402, the ball 420, and the inner wall of the case 450, by performing a foreign substance removing process for changing between the aforementioned state in which the MG1 lock is released and the aforementioned state in which the MG1 lock is performed, under the control of the ECU 100. The details of the foreign substance removing process, such as timing to perform the foreign substance removing process, will be described later.

(Operating Range)

Figure 5:
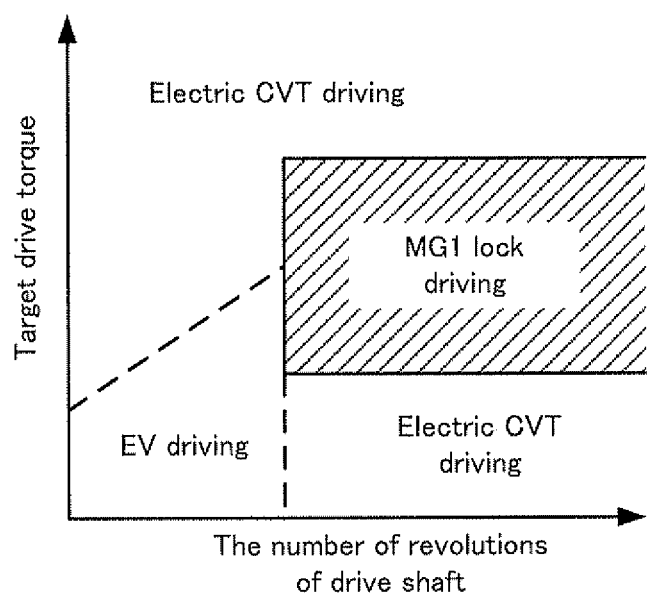
FIG. 5 is a map showing an operating range defined by a target drive torque and the number of revolutions of a drive shaft in a hybrid vehicle in the first embodiment.

Next, with reference to FIG. 5, the operating range of the hybrid vehicle in the first embodiment will be explained. FIG. 5 is a map showing the operating range defined by the target drive torque and the number of revolutions of the drive shaft in the hybrid vehicle in the first embodiment. In FIG. 5, a horizontal axis shows the number of revolutions of the drive shaft (i.e. drive shaft rotational speed), and a vertical axis shows the target drive torque (i.e. target drive torque of the drive shaft). Moreover, an operating range in which EV (Electric Vehicle) driving is performed is shown as "EV driving", an operating range in which electric CVT (Continuously Variable Transmission) driving is performed is shown as "electric CVT driving", and an operating range in which the first motor generator MG1 is locked is shown as "MG1 lock driving". Moreover, the map shown in FIG. 5 is prepared in advance on the basis of an output torque which is estimated in advance to be outputted if the engine 200 is in a steady combustion state.

The ECU 100 determines whether an operating mode is an "EV driving mode", an "electric CVT driving mode", or an "MG1 lock driving", depending on where a point determined by the target drive torque and the number of revolutions of the drive shaft (hereinafter referred to as an "operating point") is on the map shown in FIG. 5. Incidentally, in the first embodiment, it may be determined whether the operating mode is an "EV driving mode", an "electric CVT driving mode", or an "MG1 lock driving", on the basis of a position on the coordinates of the operating point determined by the output torque of the engine and the number of revolutions of the drive shaft, in addition to or instead of the operating point determined by the target drive torque and the number of revolutions of the drive shaft.

Specifically, if judging that the operating point is in the "EV driving" on the map shown in FIG. 5, the ECU 100 sets the operating mode to the "EV driving mode". If judging that the operating point is in the "electric CVT driving", the ECU 100 sets the operating mode to the "electric CVT driving mode". If judging that the operating point is in the "MG1 lock driving", the ECU 100 sets the operating mode to the "MG1 lock mode".

If setting the operating mode to the "EV driving mode", the ECU 100 controls the engine 200, the locking mechanism 400 and the PCU 500 such that the hybrid vehicle 10 performs the EV driving for driving only by using the driving force from the second motor generator MG2.

If setting the operating mode to the "electric CVT driving mode", the ECU 100 controls the engine 200, the locking mechanism 400 and the PCU 500 such that the hybrid vehicle 10 performs the electric CVT driving for driving by using the driving force outputted to the drive shaft 50 via the power dividing mechanism 300 from the engine 200 and the driving force outputted to the drive shaft 50 from the second motor generator MG2. Specifically, if setting the operating mode to the "electric CVT driving mode", the ECU 100 controls the engine 200, the locking mechanism 400 and the PCU 500 such that the power from the engine 200 is distributed to the first motor generator MG1 and the drive shaft 50 to generate electric power on the first motor generator MG1 and that the driving force from the second motor generator MG2 is outputted to the drive shaft 50.

If setting the operating mode to the "MG1 lock mode", the ECU 100 controls the engine 200, the locking mechanism 400 and the PCU 500 such that the hybrid vehicle 10 drives only by the driving force from the engine 200. Specifically, if setting the operating mode to the "MG1 lock mode", the ECU 100 controls the locking mechanism 400 to lock the first motor generator MG1. If the operating mode is the "MG1 lock mode", the transmission efficiency and the fuel efficiency can be improved, as described later.

Incidentally, if setting the operating mode to the "EV driving mode" or the "electric CVT driving mode", the ECU 100 controls the locking mechanism 400 not to lock the first motor generator MG1.

(Operation Principle)

Figure 6:
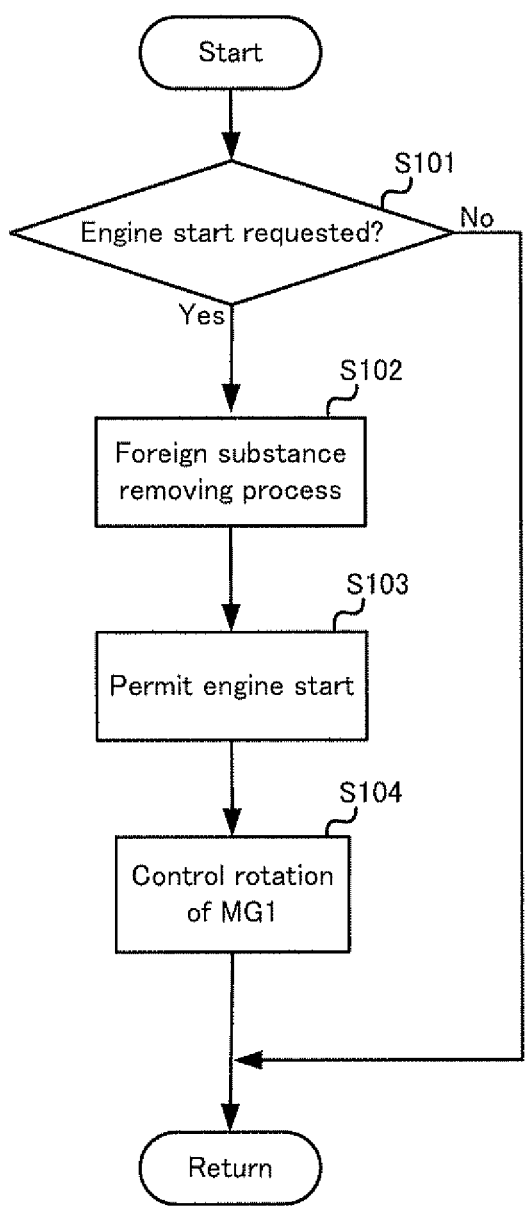
FIG. 6 is a flowchart showing a flow of a control process including a foreign substance removing process, in an ECU for integrally controlling the driving control apparatus of the hybrid vehicle in the first embodiment.
Figure 7:
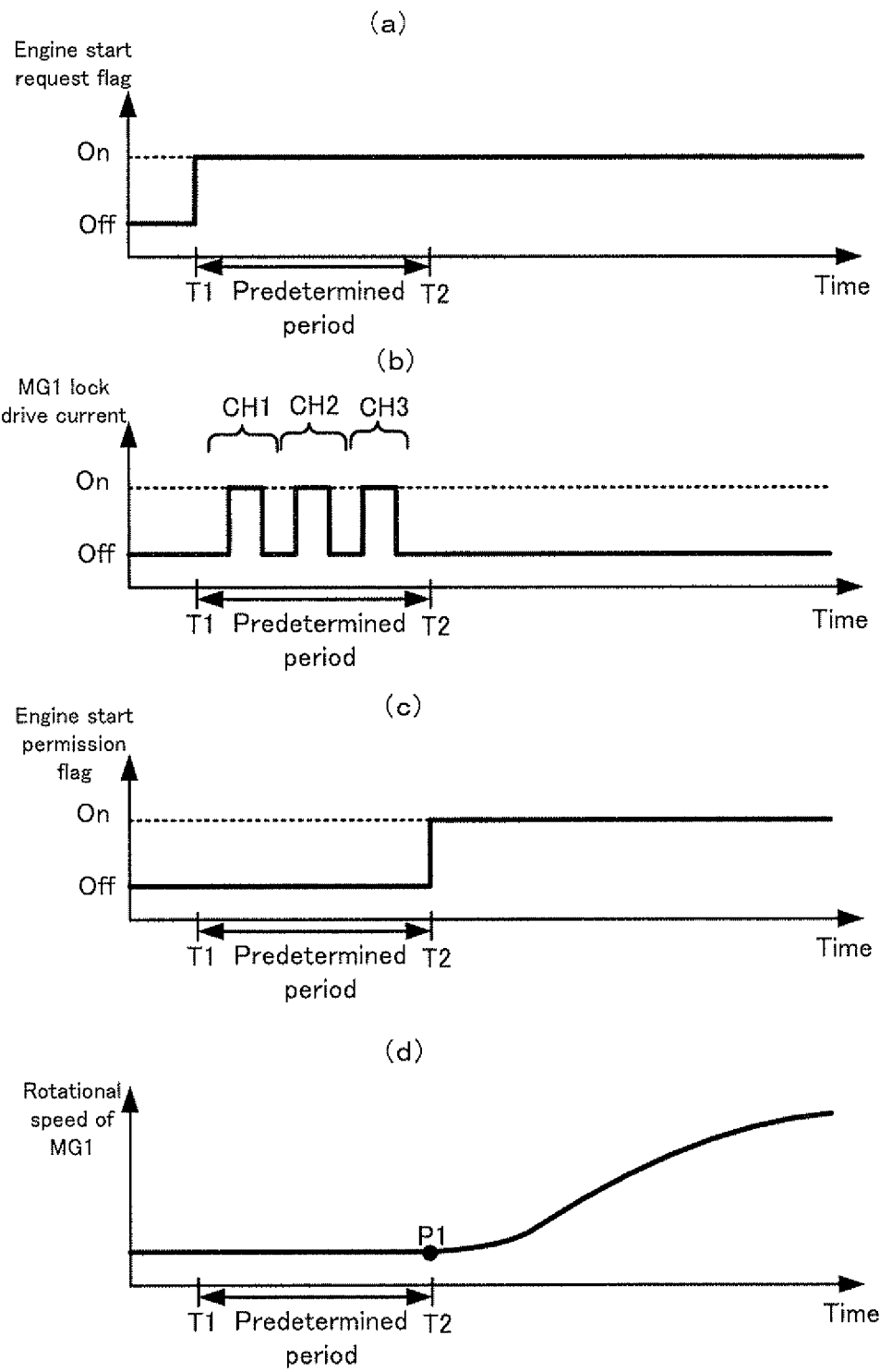
FIG. 7 are a group of graphs showing changes on time axes in an engine start request flag, a MG1 lock drive current, an engine start permission flag, and a MG1 rotational speed, in the control process in the ECU for integrally controlling the driving control apparatus of the hybrid vehicle in the first embodiment (FIG. 7(*a*), FIG. 7(*b*), FIG. 7(*c*), and FIG. 7(*d*)).
Figure 8:
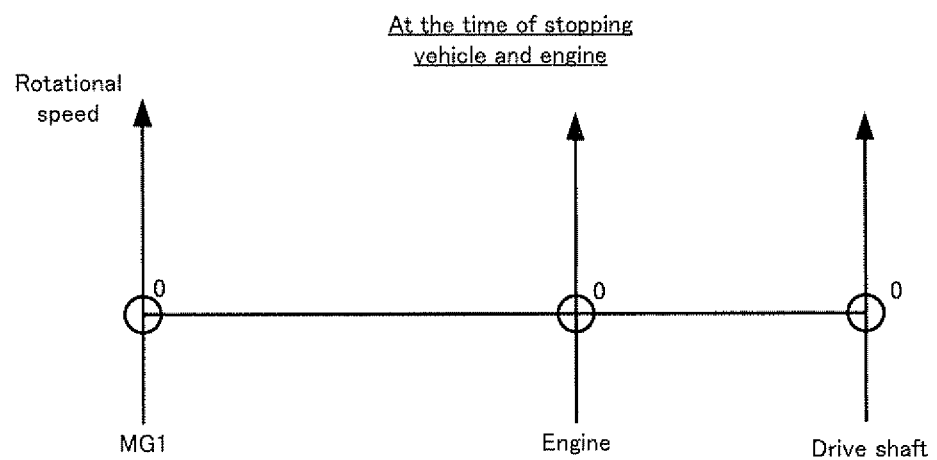
FIG. 8 is one example of a nomogram of the hybrid vehicle when the foreign substance removing process in the first embodiment is performed.

Next, with reference to FIG. 6 to FIG. 8, an explanation will be given on the operation principle of the driving control apparatus of the hybrid vehicle in the first embodiment. FIG. 6 is a flowchart showing a flow of a control process including the foreign substance removing process, in the ECU for integrally controlling the driving control apparatus of the hybrid vehicle in the first embodiment. Incidentally, the control process shown in FIG. 6 is repeated by the ECU 100 with a predetermined period. FIG. 7 are a group of graphs showing changes on time axes in an engine start request flag, a MG1 lock drive current, an engine start permission flag, and a MG1 rotational speed, in the control process in the ECU for integrally controlling the driving control apparatus of the hybrid vehicle in the first embodiment (FIG. 7(a), FIG. 7(b), FIG. 7(c), and FIG. 7(d)). FIG. 8 is one example of a nomogram of the hybrid vehicle when the foreign substance removing process in the first embodiment is performed. Incidentally, a vertical axis in FIG. 8 shows the number of revolutions of each rotating shaft, and a horizontal axis shows the gear ratio of each gear by using a distance relation.

As shown in FIG. 6, it is judged whether or not the start of the engine is requested, under the control of the ECU 100 (step S101). Specifically, if the start of the engine is requested, as shown in FIG. 7(a), the start of the engine is requested, for example, by a driver and the engine start request flag is changed from "Off" to "On" at a time point T1.

As a result of the judgment in the step S101, if it is judged that the start of the engine is requested (the step S101: Yes), the foreign substance removing process for changing between the aforementioned state in which the MG1 lock is released and the aforementioned state in which the MG1 lock is performed is performed under the control of the ECU 100 (step S102). Specifically, as shown in FIG. 7(b), the foreign substance removing process is performed by repeating "On" and "Off" of the drive current for locking the MG1 a plurality of times, in a predetermined period after the time point T1. Here, the predetermined period in the first embodiment means such a period that the MG1 lock is in the release state and that the MG1 is in the stop state in which the MG1 stops the rotation. Specifically, as shown in the nomogram in FIG. 8, the predetermined period means such a period that the number of revolutions of the MG1 is zero, that the number of revolutions of the engine is zero, and that the number of revolutions of the drive shaft is zero, in the hybrid vehicle.

More specifically, as shown in FIG. 7(b), in the predetermined period after the time point T1, a change CH1 of the release state, the engagement state, and the release state of the locking mechanism 400 is performed by changing the application state of the drive current for locking the MG1 from "Off" to "On" and by changing the application state of the drive current from "On" to "Off". Substantially in the same manner, a change CH2 of the release state, the engagement state, and the release state of the locking mechanism 400 is performed by changing the application state of the drive current from "Off" to "On" and by changing the application state of the drive current from "On" to "Off" after the first change CH1. Substantially in the same manner, a change CH3 of the release state, the engagement state, and the release state of the locking mechanism 400 is performed by changing the application state of the drive current from "Off" to "On" and by changing the application state of the drive current from "On" to "Off" after the second change CH2. Incidentally, in the predetermined period, the change of the release state, the engagement state, and the release state of the locking mechanism 400 may be performed the predetermined number of times per unit time. The predetermined number of times per unit time may be typically (i) the weight of the member 401, the member 402 and the ball 420 of the locking mechanism (refer to FIG. 4(a) and FIG. 4(b) described above or the like), (ii) a mechanistic or mechanical elastic modulus of the locking mechanism in the state change from the release state to the engagement state of the locking mechanism or in the state change from the engagement state to the release state of the locking mechanism, or (iii) a resonant frequency based on the weight of the member 401, the member 402 and the ball 420 of the locking mechanism and the mechanistic or mechanical elastic modulus of the locking mechanism.

As a result, it is possible to remove the foreign substances, which cause a failure in the change more effectively and to prevent the occurrence of the failure in the change of the MG1 lock more effectively.

Then, the start of the engine is permitted under the control of the ECU 100 (step S103). Specifically, as shown in FIG. 7(c), the engine start permission flag is changed from "Off" to "On" at a time point T2 after the foreign substance removing process is completed, under the control of the ECU.

Then, the MG1 rotational speed is controlled under the control of the ECU 100 (step S104). Specifically, as shown in FIG. 7(d), the MG1 rotational speed is controlled depending on the operating mode such as the "EV driving mode" or the "electric CVT driving mode", after the time point T1, under the control of the ECU.

In particular, in a period including a time point P1 at which the rotating shaft of the generator starts to rotate, the release state, the engagement state, and the release state of the locking mechanism 400 may be changed. By this, it is possible to exert a centrifugal force of the MG1 or vibration generated on the MG1 generated when the rotating shaft of the MG1 starts to rotate, as a physical action, on the foreign substances. As a result, it is possible to remove the foreign substances from a movable part of the locking mechanism, to reduce the influence of the foreign substances more effectively and to prevent the occurrence of the failure in the change of the locking mechanism more effectively.

On the other hand, as a result of the judgment in the step S101 described above, if it is not judged that the start of the engine is requested (the step S101: No), the control process including the foreign substance removing process in the first embodiment is temporarily ended under the control of the ECU 100.

As described above, in the first embodiment, the release state of the locking mechanism 400 and the engagement state of the locking mechanism 400 are changed, a physical force is exerted on the foreign substances which exist within the locking mechanism 400, and the foreign substances are removed from the member 401, the member 402, the ball 420 and the friction surface 450a of the case 450 (refer to FIG. 4(a) and FIG. 4(b) described above), in the predetermined period in which the rotating shaft of the MG1 does not rotate, under the control of the ECU 100 including the controller 110. By this, it is possible to effectively reduce the influence of the foreign substances within the locking mechanism 400, which cause the failure in the change between the release state and the engagement state of the locking mechanism 400, and to effectively prevent the occurrence of the failure in the change between the implementation of the MG1 lock and the release of the MG1 lock.

By this, it is possible to change between the state in which the MG1 lock is released where the rotating shaft of the MG1 can rotate and the state in which the MG1 lock is performed where the rotating shaft of the MG1 is fixed in the stop state, while almost or completely preventing the occurrence of the failure in the change between the implementation of the MG1 lock and the release of the MG1 lock. Moreover, it is possible to remarkably improve the transmission efficiency and fuel efficiency in the driving control apparatus of the hybrid vehicle.

(Oil Circulation by Oil Control Valve)

In particular, in the first embodiment, the circulation amount of the oil may be increased by the oil control valve 41 in the predetermined period under the control of the ECU 100. In addition or instead of this, the circulation time for circulating the oil by the oil control valve is changed depending on the temperature of the oil, by the oil control valve 41 (refer to FIG. 2), in the predetermined period under the control of the ECU 100. By this, it is possible to effectively exert a viscous force by the oil circulated by the oil control valve 41, as a physical action, on the foreign substances within the locking mechanism 400, depending on the increased circulation amount and circulation time of the oil. As a result, within the locking mechanism 400, it is possible to remove the foreign substances more effectively and to prevent the occurrence of the failure in the change between the implementation of the MG1 lock and the release of the MG1 lock more effectively.

In addition, in the first embodiment, the entire oil within the locking mechanism may be circulated by the oil control valve 41 before the change of the release state, the engagement state, and the release state of the locking mechanism 400 in the predetermined period under the control of the ECU 100. By this, it is possible to exert a physical force on the foreign substances which exist within the locking mechanism and to effective remove the foreign substances from the engaging device. Typically, for example, if the oil circulation is started by the oil control valve 41 after the driving control apparatus of the hybrid vehicle is stopped for several hours, the foreign substances caught on the oil filter 204 (refer to FIG. 2) immediately after the start of the oil circulation are highly likely set free within the oil system. Thus, it is desirable to circulate the oil to the degree that the entire oil within the locking mechanism is replaced and to catch the foreign substances by using the oil filter 204 before performing the foreign substance removal by the change between the implementation of the MG1 lock and the release of the MG1 lock described above.

(Study of Operation and Effects in First Embodiment)

Figure 9:
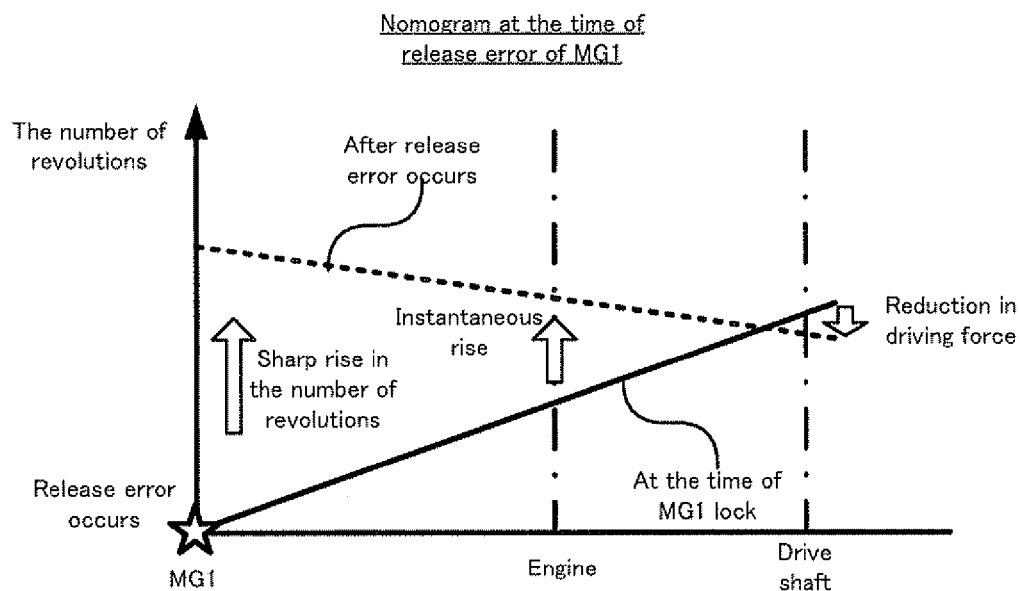
FIG. 9 are a nomogram of the hybrid vehicle when the unintentional release of the MG1 lock (i.e. release error) in a common example occurs (FIG. 9(*a*)) and a nomogram of the hybrid vehicle when the unintentional MG1 lock (i.e. engagement error) in a common example occurs (FIG. 9(b)).
Figure 9:
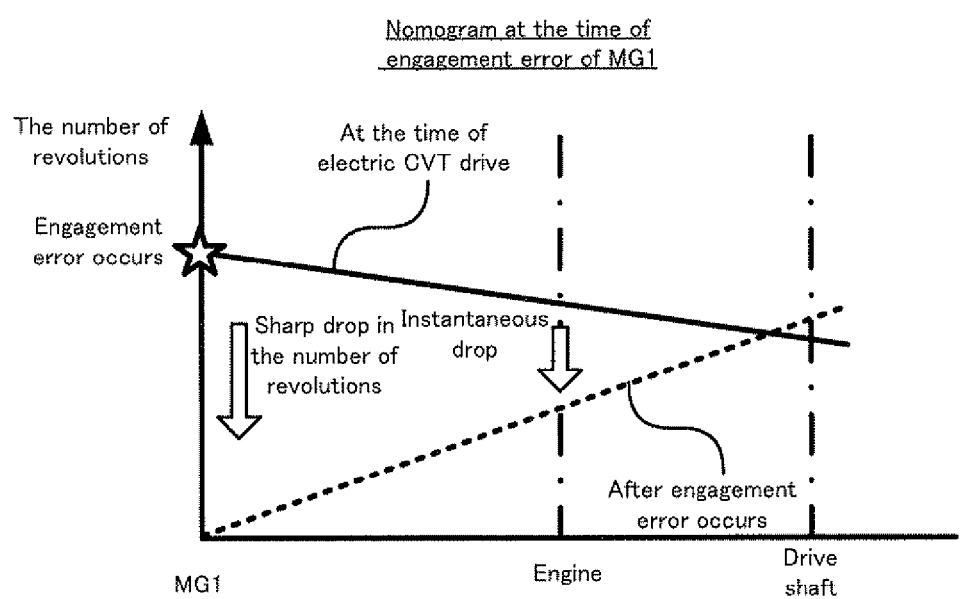

Next, with reference to FIG. 9, the operation and effects of the first embodiment will be studied. FIG. 9 are a nomogram of the hybrid vehicle when the unintentional release of the MG1 lock (i.e. release error) in a common example occurs (FIG. 9(a)) and a nomogram of the hybrid vehicle when the unintentional MG1 lock (i.e. engagement error) in a common example occurs (FIG. 9(b)).

As shown in FIG. 9(a), if the unintentional release of the MG1 lock (i.e. release error of the MG1 lock) occurs while the MG1 lock is performed during the driving of the hybrid vehicle, the driving force on the drive shaft is reduced as if it were lost, and the number of revolutions of the MG1 rises sharply. When the release error of the MG1 lock is detected, the rotational speed of the MG1 is controlled under the control of the ECU. At this time, as the number of revolutions of the engine rises instantaneously, it gives a driver a sense of discomfort. In order to prevent from giving the driver the sense of discomfort, the MG1 lock is uniformly forbidden after the release error of the MG1 lock. This causes such a technical problem that the improvement in transmission efficiency and fuel efficiency by the MG1 lock is prevented in the hybrid vehicle.

As for the release error of the MG1 lock, in detail, a space is generated between the member 402 and the case 450 due to mechanistic or physical causes in the locking mechanism 400, and the release error of the MG1 lock occurs. For example, it is considered that the space is generated between the member 402 and the case 450 due to an unintentional external input torque, obtained by transmitting a reaction force from a road surface to the rotating shaft of the MG1 via the drive shaft, as the mechanistic cause, and that the release error of the MG1 lock occurs. Alternatively, it is considered that the space is generated between the member 402 and the case 450 by that the member 402 is caught in an obstacle, such as a foreign substance and an uneven portion, when the member 402 is displaced to press it toward the case 450, as the physical cause, and that the release error of the MG1 lock occurs.

Alternatively, as shown in FIG. 9(b), if the unintentional implement of the MG1 lock (i.e. engagement error of the MG1 lock) occurs while the hybrid vehicle drives e.g. in the "electric CVT mode", although the number of revolutions of the MG1 drops sharply and the number of revolutions of the engine drops instantaneously, the driving force on the drive shaft is maintained. Thus, a shear force is generated in the radial direction of the drive shaft, which likely bends and shears the drive shaft, so that there is a possibility that the hybrid vehicle is physically damaged.

In contrast, according to the first embodiment, the release state of the locking mechanism 400 and the engagement state of the locking mechanism 400 are changed, a physical force is exerted on the foreign substances which exist within the locking mechanism 400, and the foreign substances are removed from the locking mechanism 400, in the predetermined period in which the rotating shaft of the MG1 does not rotate, under the control of the ECU 100. By this, it is possible to effectively reduce the influence of the foreign substances within the locking mechanism 400, which cause the failure in the change between the release state and the engagement state of the locking mechanism 400, and to effectively prevent the occurrence of the failure in the change between the implementation of the MG1 lock and the release of the MG1 lock.

As a result, it is possible to change between the state in which the MG1 lock is released where the rotating shaft of the MG1 can rotate and the state in which the MG1 lock is performed where the rotating shaft of the MG1 is fixed in the stop state, while almost or completely preventing the occurrence of the failure in the change between the implementation of the MG1 lock and the release of the MG1 lock. Moreover, it is possible to remarkably improve the transmission efficiency and fuel efficiency in the driving control apparatus of the hybrid vehicle.

Second Embodiment

Figure 10:
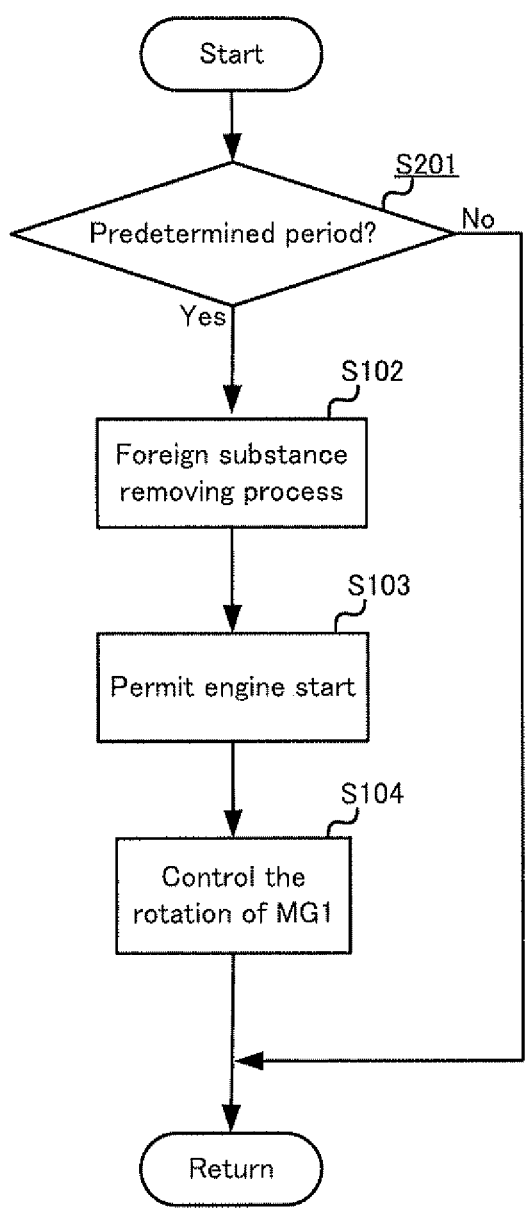
FIG. 10 is a flowchart showing a flow of a control process including the foreign substance removing process, in the ECU for integrally controlling a driving control apparatus of a hybrid vehicle in a second embodiment.
Figure 11:
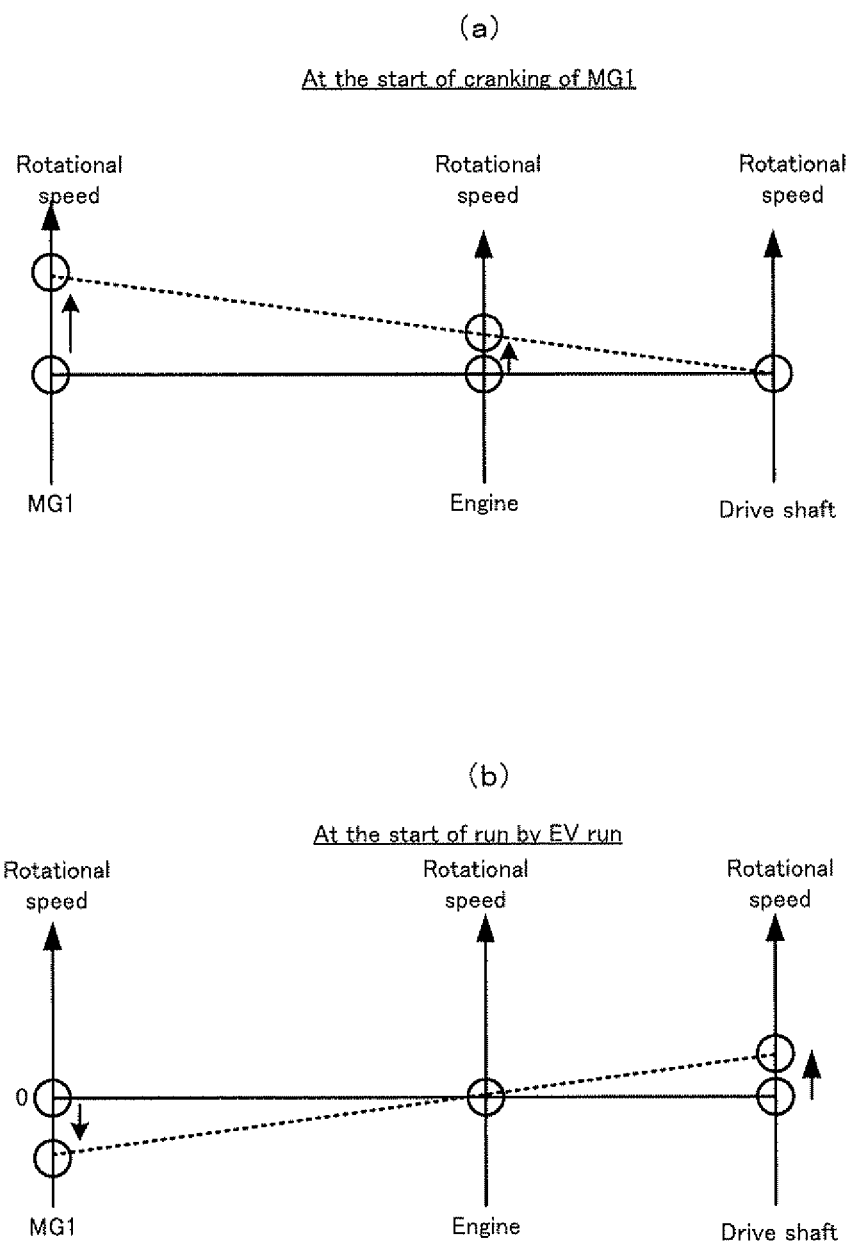
FIG. 11 are one example and another example of the nomogram of the hybrid vehicle in a predetermined period in which the foreign substance removing process is performed in the second embodiment (FIG. 11(a) and FIG. 11(b)).

Next, with reference to FIG. 10 and FIG. 11, an explanation will be given on the operation principle of a driving control apparatus of a hybrid vehicle in a second embodiment of the present invention. FIG. 10 is a flowchart showing a flow of a control process including the foreign substance removing process, in the ECU for integrally controlling the driving control apparatus of the hybrid vehicle in the second embodiment. Incidentally, the control process shown in FIG. 10 is repeated by the ECU 100 with a predetermined period. FIG. 11 are one example and another example of the nomogram of the hybrid vehicle in a predetermined period in which the foreign substance removing process is performed in the second embodiment (FIG. 11(a) and FIG. 11(b)). Incidentally, vertical axes in FIG. 11(a) and FIG. 11(b) show the number of revolutions of each rotating shaft, and horizontal axes show the gear ratio of each gear in a distance relation.

As shown in FIG. 10, it is judged whether it is a predetermined period in which the foreign substance removing process for changing from the aforementioned state in which the MG1 lock is performed, under the control of the ECU 100 (step S201). Specifically, as shown in the nomogram in FIG. 11(a), it is judged whether or not it is the predetermined period in which the hybrid vehicle is stopped and which includes a time point at which cranking by the MG1 is started when the engine is started. By performing the foreign substance removing process in the predetermined period, it is possible to exert a centrifugal force of the MG1 or vibration generated on the MG1 generated when the cranking for starting the internal combustion engine is started by the MG1, as a physical action, on the foreign substances. As a result, it is possible to remove the foreign substances from an engagement portion within the locking mechanism, to reduce the influence of the foreign substances more effectively and to prevent the occurrence of the failure in the change between the implementation of the MG1 lock and the release of the MG1 lock more effectively.

Alternatively, specifically, as shown in the nomogram in FIG. 11(b), it is judged whether or not it is the predetermined period including a time point at which the EV driving is started by the MG2, from the state in which the hybrid vehicle is stopped. By performing the foreign substance removing process in the predetermined period, it is possible to exert a centrifugal force of the MG1 or vibration generated on the MG1 generated when the MG1 starts inverse rotation by the MG2, as a physical action, on the foreign substances. As a result, it is possible to remove the foreign substances from an engagement portion within the locking mechanism, to reduce the influence of the foreign substances more effectively and to prevent the occurrence of the failure in the change between the implementation of the MG1 lock and the release of the MG1 lock more effectively.

The present invention is not limited to the aforementioned embodiments, but various changes may be made, if desired, without departing from the essence or spirit of the invention which can be read from the claims and the entire specification. A driving control apparatus and method of a hybrid vehicle, which involves such changes, is also intended to be within the technical scope of the present invention.

INDUSTRIAL APPLICABILITY

The present invention can be applied to a driving control apparatus and method of a hybrid vehicle.

DESCRIPTION OF REFERENCE CODES 10 hybrid vehicle
50 drive shaft
100 ECU
110 controller
200 engine
300 power dividing mechanism
400 locking mechanism
600 battery
1000 lubricating system
40 cooling lubricating system
2000 mechanistic pump system
3000 electric pump system
MG1 first motor generator
MG2 second motor generator

The invention claimed is:

1. A driving control apparatus of a hybrid vehicle comprising:
   an internal combustion engine;
   a generator capable of performing power generation by power of said internal combustion engine and capable of charging a storage battery with electric power obtained by the power generation;
   a power dividing mechanism for dividing the power of said internal combustion engine into a drive shaft and a rotating shaft of said generator;
   an electric motor capable of outputting power according to electric power supplied from at least one of said generator and the storage battery, to the drive shaft;
   a changing device capable of changing an operating state of said generator, from one state to the other state out of a first state in which the rotating shaft of said generator can rotate and a second state in which the rotating shaft of said generator is fixed in a stop state; and
   a controlling device for controlling said changing device to change the operating state of said generator from the other state to the one state after changing the operating state of said generator from the one state to the other state, in a predetermined period in which the rotating shaft of said generator does not rotate.

2. The driving control apparatus of the hybrid vehicle according to claim 1, wherein said controlling device controls said changing device to change the operating state of said generator from the first state to the second state, in a period in which the operating state of said generators is the first state and in which the rotating shaft of said generator does not rotate, as the predetermined period.

3. The driving control apparatus of the hybrid vehicle according to claim 1, wherein said controlling device controls said changing device to perform the change of the operating state of said generator from the other state to the one state after changing the operating state of said generator from the one state to the other state, twice or more, in the predetermined period.

4. The driving control apparatus of the hybrid vehicle according to claim 1, wherein said controlling device controls said changing device to change the operating state of said generator from the one state to the other state, in a period including a time point at which the rotating shaft of said generator starts to rotate, as the predetermined period.

5. The driving control apparatus of the hybrid vehicle according to claim 1, wherein
said driving control apparatus of the hybrid vehicle comprises an engaging device capable of braking rotation of said generator by engaging with one portion of the hybrid vehicle equipped with said internal combustion engine, as said changing device, and
said controlling device controls said engaging device to change the operating state of said generator from one state to the other state out of the first state in which the rotating shaft of said generator can rotate by said engaging device becoming in a non-engagement state in which said engaging device does not engage with the one portion, and the second state in which the rotating shaft of said generator is stopped by said engaging device becoming in an engagement state in which said engaging device engages with the one portion, in the predetermined period.

6. The driving control apparatus of the hybrid vehicle according to claim 5, wherein said controlling device controls said engaging device to perform a pair operation the predetermined number of times per unit time in the predetermined period, the pair operation being performed in pairs made by an engagement operation of changing a state from the non-engagement state to the engagement state and a non-engagement operation of changing a state from the engagement state to the non-engagement state.

7. The driving control apparatus of the hybrid vehicle according to claim 5, wherein
said driving control apparatus of the hybrid vehicle further comprises an oil control valve for controlling circulation of oil, which can conduct heat generated by an engagement operation of changing a state from the non-engagement state to the engagement state and a non-engagement operation of changing a state from the engagement state to the non-engagement state and which can lubricate the engagement operation and the non-engagement operation, and
said controlling device allows said oil control valve to circulate the oil in addition to controlling said changing device to change the operating state of said generator from the one state to the other state, in the predetermined period.

8. The driving control apparatus of the hybrid vehicle according to claim 7, wherein said controlling device allows said oil control valve to change a circulation time to circulate the oil, depending on a temperature of the oil, in addition to or instead of increasing circulation amount of the oil by using said oil control valve, in the predetermined period.

9. The driving control apparatus of the hybrid vehicle according to claim 7, wherein said controlling device allows said oil control valve to circulate the oil in the vicinity of said engaging device, before controlling said changing device to change the operating state of said generator from the one state to the other state, in the predetermined period.

10. The driving control apparatus of the hybrid vehicle according to claim 1, wherein
said driving control apparatus of the hybrid vehicle comprises a first motor generator as said generator,
said driving control apparatus of the hybrid vehicle comprises a second motor generator as said electric motor, and
said controlling device controls said changing device to change the operating state of said generator from the one state to the other state, in a period including a time point at which cranking for starting said internal combustion engine is started by said first motor generator or said second motor generator, as the predetermined period.

11. The driving control apparatus of the hybrid vehicle according to claim 1, wherein
said driving control apparatus of the hybrid vehicle comprises a first motor generator as said generator,
said driving control apparatus of the hybrid vehicle comprises a second motor generator as said electric motor, and
said controlling device controls said changing device to change the operating state of said generator from the one state to the other state, in a period including a time point at which power according to electric power starts to output to the drive shaft by said first motor generator or said second motor generator, as the predetermined period.

12. A driving control method of a hybrid vehicle in a driving control apparatus of a hybrid vehicle comprising: an internal combustion engine; a generator capable of performing power generation by power of said internal combustion engine and capable of charging a storage battery with electric power obtained by the power generation; a power dividing mechanism for dividing the power of said internal combustion engine into a drive shaft and a rotating shaft of said generator; an electric motor capable of outputting power according to electric power supplied from at least one of said generator and the storage battery, to the drive shaft; and a changing device capable of changing an operating state of said generator, from one state to the other state out of a first state in which the rotating shaft of said generator can rotate and a second state in which the rotating shaft of said generator is fixed in a stop state, said method comprising:
a controlling process of controlling said changing device to change the operating state of said generator from the other state to the one state after changing the operating state of said generator from the one state to the other state, in a predetermined period in which the rotating shaft of said generator does not rotate.

* * * * *